United States Patent
Codilian (10) Patent No.: US 6,989,953 B1
(45) Date of Patent: Jan. 24, 2006

(54) DISK DRIVE AND DISK DRIVE-CONTAINING DEVICE HAVING SELECTIVELY CONTROLLABLE SPINDLE MOTOR SPIN UP PROFILES

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 66 days.

(21) Appl. No.: 10/446,886

(22) Filed: May 27, 2003

(51) Int. Cl.
*G11B 15/46* (2006.01)

(52) U.S. Cl. .............................. 360/73.03; 360/73.01; 360/71

(58) Field of Classification Search ................ 360/71, 360/73.01, 73.03
See application file for complete search history.

(56) References Cited

U.S. PATENT DOCUMENTS

| | | | |
|---|---|---|---|
| 6,101,065 A * | 8/2000 | Alfred et al. ............ | 360/78.04 |
| 6,445,531 B1 * | 9/2002 | Gaertner et al. ......... | 360/78.06 |
| 6,710,567 B2 * | 3/2004 | Heydt et al. ................. | 318/560 |
| 6,757,481 B1 * | 6/2004 | Nazarian et al. .............. | 386/69 |
| 6,809,545 B2 * | 10/2004 | Hotchkiss .................... | 326/16 |
| 2003/0161236 A1 * | 8/2003 | Wakui ..................... | 369/47.46 |

FOREIGN PATENT DOCUMENTS

| JP | 2001202683 A | * | 7/2001 |
| JP | 2002032952 A | * | 1/2002 |

* cited by examiner

*Primary Examiner*—David Hudspeth
*Assistant Examiner*—Jason Olson
(74) *Attorney, Agent, or Firm*—Young Law Firm; Joshua C. Harrison, Esq.

(57) ABSTRACT

A spindle motor in a disk drive is driven by a driving circuit that, upon receipt of a signal or command, selectively spins up the spindle motor according to a first spin up profile or according to a second spin up profile that is defined to provide a longer spin up time in comparison with the spin up time defined by the first spin up profile. The second spin up profile spins up the spindle motor in a longer period of time and/or generates less acoustic noise as compared to the first spin up profile.

33 Claims, 5 Drawing Sheets

DISK DRIVE AND DISK DRIVE-CONTAINING DEVICE HAVING SELECTIVELY CONTROLLABLE SPINDLE MOTOR SPIN UP PROFILES

BACKGROUND OF THE INVENTION

1. Field of the Invention

The present invention relates to disk drives and disk drive-containing devices having selectively controllable spindle motor spin up profiles. More particularly, the present invention relates to disk drives and disk drive-containing devices that are responsive to a command from a host device, adaptively responsive to a predetermined signal and/or to other internal or external stimuli to cause the spindle motor to spin up according to a selected one of a plurality of spin up profiles.

2. Description of the Prior Art and Related Information

It is conventional wisdom that, for disk drives, faster is better. When considering the spin up time of spindle motors of disk drives, the faster they are able to spin up to their target operating speed (e.g., 7200 rpm), the faster the drive will be ready to read and write data to and from the disk. Competitive forces, therefore, have conventionally steered the hard disk drive industry to develop drives that include spindle motors exhibiting fast spin up times. It has been found, however, that drives exhibit higher levels of acoustic noise during spin up than during normal operation when the spindle motor has reached its target speed. A balance has, therefore, been sought between competitive performance (fast spin up times) and acceptable levels of acoustical noise. In other words, hard disk drives designed for personal computers, workstations and servers are most often manufactured with spindle motors that are driven to spin up in the shortest period of time that does not produce objectionable noise levels.

The realm of applications in which disk drives are deployed, however, is growing. Increasingly, the high storage densities, low cost, modest power requirements and small size of current drives are having a synergistic effect upon the development and popularization of a wide variety of newly emergent digital consumer devices, such as digital cameras, mobile telephones, personal digital assistants (PDAs) and digital video recorders, to name a few. In such devices, it has been found that the acoustic noise inherent in short spindle motor spin up times frequently is perceived as a lack of quality and workmanship, if not an outright annoyance. Therefore, merely integrating conventional drives (wherein performance and acoustics are balanced) may not adequately address the fundamental differences between computer-based applications and consumer devices and appliances. For example, there may be instances in which a relatively high level of audible acoustic noise may be acceptable. Conversely, there may also be instances in which the acoustic noise generated by the spindle motor during spin up should be minimized.

Digital video recorder/players are illustrative of a class of consumer digital devices in which acoustic noise may affect consumer perception and acceptance thereof. For example, during times when the recorder/player is downloading information over a low bandwidth channel or in the middle of the night, it may be desirable, to avoid distracting or annoying the user, to operate the disk drive in the quietest mode possible. Alternatively, while a moderate level of audible drive noise may be undetectable when the ambient noise levels are high, such a moderate level of audible drive noise may become objectionable when the ambient acoustic levels lower. Notwithstanding such special purpose applications, it is anticipated that these units will in some instances serve as information processors, which at times will be demanding of hard disk performance. If disk drives are to be successfully integrated into everyday consumer devices such as digital video recorders and playback machines, cameras, musical instruments, kitchen appliances and the like, their existence and modes of operation must become uniformly unobtrusive, reliable, user-friendly and even adaptive, particularly with respect to the acoustic noise they generate.

SUMMARY OF THE INVENTION

Accordingly, this invention may be regarded as a disk drive, comprising a base; a disk; a spindle motor for spinning the disk, the spindle motor being attached to the base; a spindle motor driving circuit for driving the spindle motor, the spindle motor driving circuit being configured to selectively spin up the spindle motor according to a first spin up profile or a second spin up profile defined to provide a longer spin up time in comparison with a spin up time defined by the first spin up profile.

The spindle motor driving circuit may be configured to drive the spindle motor according to the first spin up profile responsive to a first command and to drive the spindle motor according to the second spin up profile responsive to a second command. The spindle motor driving circuit may be configured to drive the spindle motor according to the first spin up profile responsive to a first signal and to drive the spindle motor according to the second spin up profile responsive to a second signal. The first and second spin up profiles may be defined such that the spindle motor generates less acoustic noise when spinning up according to the second spin profile than when spinning up according to the first spin up profile.

The disk drive may be configured to receive the first and second commands from a host device, for example. The disk drive may further include a register for storing a spin up profile flag and the spindle motor driving circuit may be configured to drive the spindle motor according to the first spin up profile when the spin up profile flag is in a first logical state and to drive the spindle motor according to the second spin up profile when the spin up profile flag is in a second logical state. The disk drive may further include a flash memory for storing a spin up profile flag and the spindle motor driving circuit may be configured to drive the spindle motor according to the first spin up profile when the spin up profile flag is in a first logical state and to drive the spindle motor according to the second spin up profile when the spin up profile flag is in a second logical state. The logical state of the spin up profile flag may be set during an Initial Burn-In (IBI) of the disk drive, for example. The disk drive may include a read only memory (ROM) for storing a spin up profile flag hard coded in the ROM and the spindle motor driving circuit may be configured to drive the spindle motor according to the first spin up profile when the spin up profile flag is in a first logical state and to drive the spindle motor according to the second spin up profile when the spin up profile flag is in a second logical state. The disk drive may include a spin up profile jumper and the spindle motor driving circuit may be configured to drive the spindle motor according to the first spin up profile when the spin up profile jumper is in a first state and to drive the spindle motor according to the second spin up profile when the spin up profile jumper is in a second state. The disk drive may include a user-actuable switch and the spindle motor driving circuit may be configured to spin up the spindle motor according to the first spin up profile when the user-actuable switch is in a first state and to spin up the spindle motor according to the second spin up profile when the user-actuable switch is in a second state. The disk drive may include an ambient acoustic level measuring circuit coupled to the spindle motor driving circuit, the spindle motor driving circuit being configured to spin up the spindle motor according to the first spin up profile when the ambient acoustic level is above a selectable threshold and to spin up the spindle motor according to the second spin up profile when the ambient acoustic level is below the selectable threshold. The ambient acoustic level measuring circuit may include a microphone. The disk drive may be further configured to receive a time of day indicating signal and the spindle motor driving circuit may be configured to selectively spin up the spindle motor according to either the first spin up profile or the second spin up profile responsive to a state of the time of day indicating signal, the state of the time of day indicating signal indicating a time of day. The disk drive further may include a clock configured to generate the time of day indicating signal. The disk drive may be configured to receive the time of day indicating signal from a host device. The spindle motor driving circuit may be configured to selectively drive the spindle motor according to one of a plurality of mutually different third spin up profiles, each of the plurality of third spin up profiles being defined to provide mutually different combinations of spin up times and audible noise during spin up of the spindle motor. The disk drive may include an ambient acoustic level measuring circuit coupled to the spindle motor driving circuit and the spindle motor driving circuit may be configured to drive the spindle motor according to the first spin up profile, the second spin up profile or one of the plurality of third spin up profiles according to the ambient acoustic level measured by the ambient acoustic level measuring circuit.

According to another embodiment thereof, the present invention is also a host device including a user interface and a data storage device, the data storage device comprising a base; a disk; a spindle motor for spinning the disk, the spindle motor being attached to the base; a spindle motor driving circuit for driving the spindle motor, the spindle motor driving circuit being configured to selectively spin up the spindle motor according to a first spin up profile, or a second spin up profile defined to provide a longer spin up time in comparison with the spin up time defined by the first spin up profile.

The spindle motor may be configured to be spun up according to the first spin up profile responsive to a first command and to be spun up according to the second spin up profile responsive to a second command. The spindle motor may be configured to be spun up according to the first spin up profile responsive to a first signal and to be spun up according to the second spin up profile responsive to a second signal. The first and second spin up profiles may be defined such that the spindle motor generates less acoustic noise when spinning up according to the second spin profile than when spinning up according to the first spin up profile. The host device may include an ambient acoustic level measuring circuit, the spindle motor being configured to be spun up according to the first spin up profile when the ambient acoustic level is above a selectable threshold and to be spun up according to the second spin up profile when the ambient acoustic level is below the selectable threshold. The ambient acoustic level measuring circuit may include a microphone.

The present invention, according to another embodiment thereof, is a random access media recorder/player configured to record and play a video and/or audio stream, comprising: a user interface and a disk drive, the disk drive including: a base; a disk; a spindle motor for spinning the disk, the spindle motor being attached to the base; a spindle motor driving circuit for driving the spindle motor, the spindle motor driving circuit being configured to selectively spin up the spindle motor according to a first spin up profile, or a second spin up profile defined to provide a longer spin up time in comparison with a spin up time defined by the first spin up profile.

The spindle motor may be configured to be spun up according to the first spin up profile responsive to a first command and to be spun up according to the second spin up profile responsive to a second command. The spindle motor may be configured to be spun up according to the first spin up profile responsive to a first signal and to be spun up according to the second spin up profile responsive to a second signal. The first and second spin up profiles may be defined such that the spindle motor generates less acoustic noise when spinning up according to the second spin profile than when spinning up according to the first spin up profile, for example. The media recorder/player may further include an ambient acoustic level measuring circuit, the spindle motor being configured to be spun up according to the first spin up profile when the ambient acoustic level is above a selectable threshold and to be spun up according to the second spin up profile when the ambient acoustic level is below the selectable threshold. The ambient acoustic level measuring circuit may include a microphone.

According to another embodiment thereof, the present invention is also a method of operating a disk drive, comprising a) spinning up the spindle motor according to a first spin up profile responsive to a first command; b) spinning up the spindle motor according to a second spin up profile responsive to a second d command, the second spin up profile being defined to provide a longer spin up time in comparison with a spin up time defined by the first spin up profile, and c) selectively reading and/or writing to a disk after the spindle motor has been spun up to a target operating velocity.

The first and second spin up profiles in a) and b) may be defined such that the spindle motor generates less acoustic noise when spinning up according to the second spin profile than when spinning up according to the first spin up profile. The first and second spin up profiles in a) and b) may be defined such that the spindle motor spins up in a shorter period of time when spinning up according to the first spin profile than when spinning up according to the second spin profile. Step a) may be carried out responsive to a first command and b) may be carried out responsive to a second command. The method may also include receiving the first command or the second command from a host device. The disk drive may include a register for storing a spin up profile flag and a) may be carried out when the spin up profile flag may be in a first logical state and b) may be carried out when the spin up profile flag may be in a second logical state. The disk drive may include a flash memory for storing a spin up profile flag and a) may be carried out when the spin up profile flag may be in a first logical state and b) may be carried out when the spin up profile flag may be in a second logical state. The method may further include setting the logical state of the spin up profile flag during an Initial Burn-In (IBI) of the disk drive. The disk drive may include a read only memory (ROM) for storing a spin up profile flag hard coded in the ROM and a) may be carried out when the spin up profile flag may be in a first logical state and b) may be carried out when the spin up profile flag may be in a second logical state. The disk drive may include a spin up profile jumper and a) may be carried out when the spin up profile jumper is in a first state and b) may be carried out when the spin up profile jumper is in a second state. The disk drive may include a user-actuable switch and a) may be carried out when the user-actuable switch is in a first state and b) may be carried out when the user-actuable switch is in a second state. The disk drive may include an ambient acoustic level measuring circuit, and a) may be carried out when the ambient acoustic level is above a selectable threshold and b) may be carried out when the ambient acoustic level is below the selectable threshold. The ambient acoustic level measuring circuit may include a microphone and a) may be carried out when the ambient acoustic level measured by the microphone is above a selectable threshold and b) may be carried out when the ambient acoustic level measured by the microphone is below the selectable threshold. The method may further include receiving a clock signal and a) or b) may be carried out responsive to a state of the clock signal, the state of the clock signal indicating a time of day. The disk drive further may include a clock configured to generate the clock signal and a) or b) may be carried out responsive to the state of the clock signal generated by the clock. The method may further include receiving the clock signal from a host device. The method may include c) pinning up the spindle motor according to one of a plurality of mutually different third spin up profiles responsive to a corresponding plurality of mutually different third commands, each of the plurality of third spin up profiles being defined to provide mutually different combinations of spin up times and audible acoustic noise during spin up of the spindle motor. The disk drive may include an ambient acoustic level measuring circuit and a), b) or c) may be carried out according to the ambient acoustic level measured by the ambient acoustic level measuring circuit.

The foregoing and other features of the invention are described in detail below and set forth in the appended claims.

DETAILED DESCRIPTION

Figure 1:
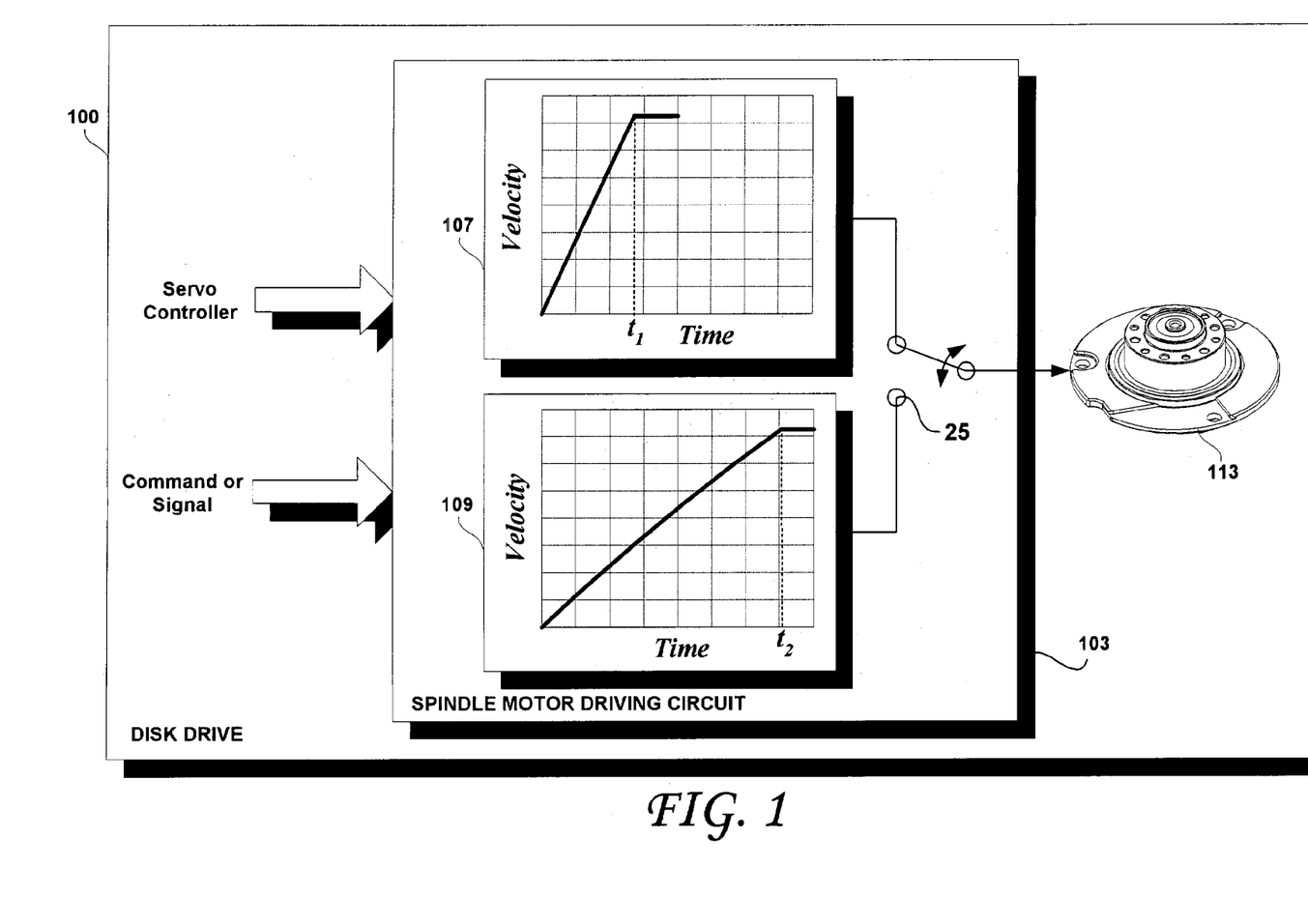
FIG. 1 is a block diagram of a disk drive according to an embodiment of the present invention.

FIG. 1 is a functional block diagram of a disk drive 10 that selectively spins up the spindle motor according to a first or a second spin up profile, according to an embodiment of the present invention. Within the context of the present inven-
tion, "spin up" and "spinning up" means that phase or operation of the spindle motor 113 during which its velocity is ramping up from a zero or reduced velocity up to its target velocity. As shown, the disk drive 100 includes a spindle motor driving circuit 103 for driving the spindle motor 113. The spindle motor driving circuit 103 may be configured to selectively spin up the spindle motor according to a first spin up profile 107 or a second spin up profile 109. Additional spin up profiles may be defined. According to one embodiment of the present invention, the second spin up profile 109 may be defined to provide a longer spin up time in comparison with a spin up time defined by the first spin up profile 107. That is, when the spindle motor driving circuit 103 spins up the spindle motor 113 according to the second spin up profile, the spindle motor is spun up such that it takes relatively comparatively longer to spin up to its target velocity (e.g., 7200 rpm) than it would were the spindle motor 113 spun up to its target velocity according to the first spin up profile 107. As shown in FIG. 1, a signal or command may cause the spindle motor driving circuit 103 to select from among the available spin up profiles. That is, the spindle motor driving circuit 103 may be configured to drive the spindle motor 113 according to the first spin up profile 107 responsive to a first command or signal and to drive the spindle motor 113 according to the second spin up profile 109 responsive to a second command or signal. The switching between the first and second spin profiles 107 and 109 is functionally symbolized by the switch 25. It is to be understood that the representation of the switch 25 in FIG. 1 may denote a physical switch (user-actuable or controlled), one or more logic commands or signals, some internal or external stimuli or may be considered to be but a conceptual representation of the operation of switching between spin up profiles. The switch 25 (that is, the switching between the spin up profiles 107, 109 and any other spin profiles that may be defined) may be controlled by the spindle motor driving circuit 103 and/or other circuitry within the disk drive 100 or host device (e.g., a personal computer, personal Digital Assistant, a camera or any other drive-containing device). A disk drive 100 according to embodiments of the present invention may be configured such that it follows a single selected spin up profile during its operating lifetime. For example, a spin up profile may be selected during an Initial Burn-In (IBI) of the disk drive. To do so, a spin up flag may be stored in, for example, a non-volatile memory of the drive, the value of the spin up flag designating the selected one of the spin up profiles. Alternatively, the spin up profile followed by the spindle motor 113 need not be set for the operating lifetime of the drive or device, but may be selected from among a plurality of defined spin up profiles during the course of normal use thereof.

Figure 2:
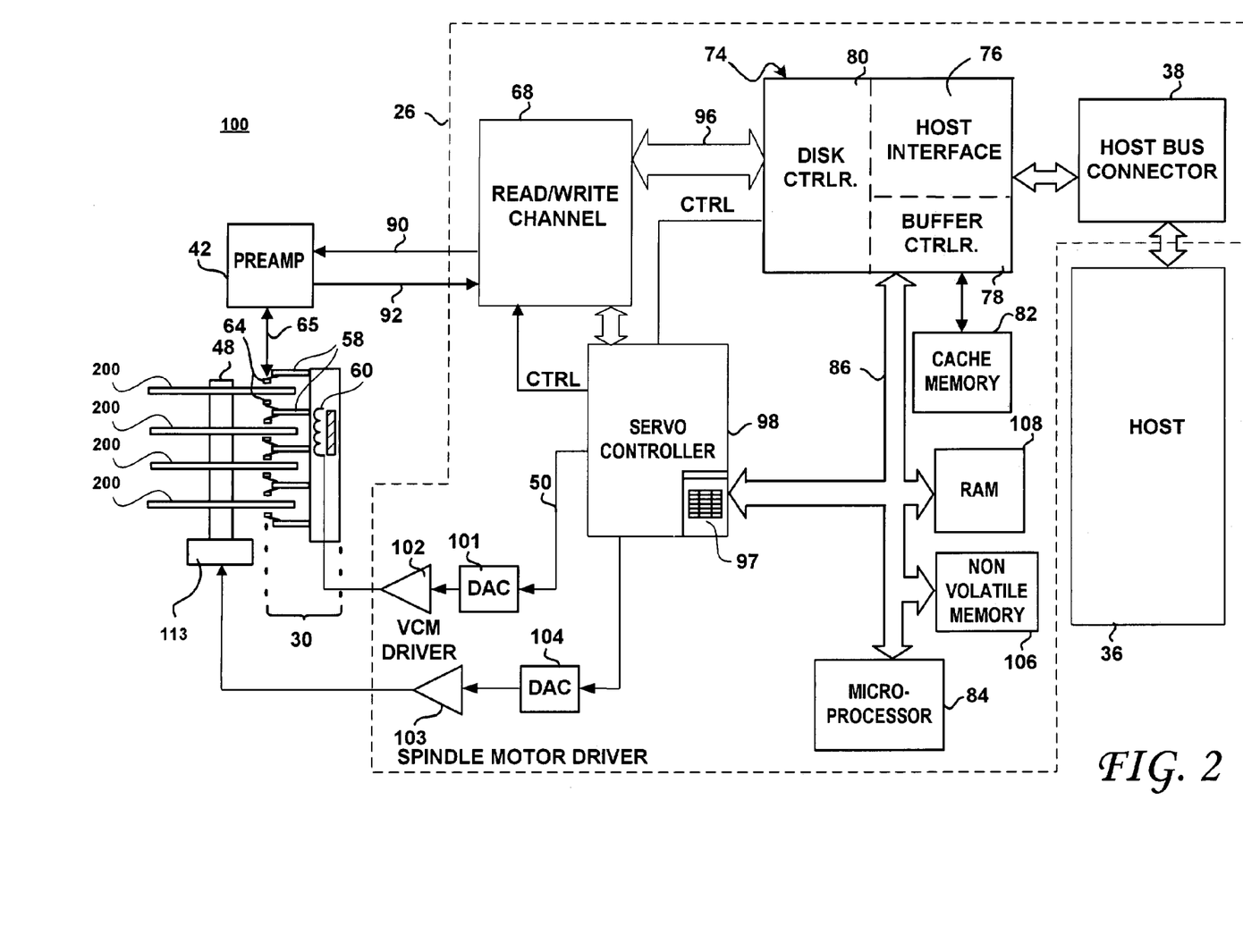
FIG. 2 is a block diagram illustrating aspects of an embodiment of a disk drive, according to the present invention.

FIG. 2 is a functional block diagram of the major electrical components of the disk drive 100 of FIG. 1, according to an embodiment of the present invention. As shown in FIG. 2, disk drive 100 may be connected to a host computer 36 via host bus connector 38 for the transfer of commands, status and data. One suitable standard for such connection is the EIDE standard presently favored for desktop personal computers, although the present invention is not dependent upon or limited thereto. The disk drive 100 comprises one or more disks 200 for data storage, a spindle motor 113 for rapidly spinning each disk 200 (four disks being shown in FIG. 2) on a spindle 48 and an actuator assembly 130 for swinging a plurality of heads 64 in unison over each disk 200. The heads 64 are connected to a preamplifier 42 via a cable assembly 65 for reading from and writing data to the disks 12. Preamplifier 42 is connected to a read/write channel 68 via read data line 92 and write data line 90.

The servo means 26 of FIG. 1 may comprise a read/write channel 68, servo controller 98, host interface and disk controller (HIDC) 74, digital to analog converter (DAC) 101, voice coil motor (VCM) driver 102, spindle motor driver (SMD) 103, interface processor 84, and several memory arrays, including servo controller internal memory 97, cache memory buffer 82, random access memory (RAM) 108, and non-volatile memory (ROM) 106.

Operations for reading and writing data in disk drive 100 initiated by the host 36 are executed under the control of a microprocessor 84 connected to the controllers and memory arrays via a bus 86. Program code executed by microprocessor 84 may be stored in the ROM 106 and/or the RAM 108. Program overlay code stored on reserved tracks of disks 200 may also be loaded into RAM 108, as required for execution. Suitably, the functionality of the microprocessor 84, the HDIC 74, the servo controller 98 and/or the host bus connector 38 may be integrated into a single disk processor unit.

During seek operations, whether to read or to write data to disk, data transferred by preamplifier 42 is encoded and decoded by read/write channel 68. During read operations, the channel 68 decodes data into digital bits that may be transferred on a non-return to zero (NRZ) bus 96 to HIDC 74. During write operations, the HIDC 74 provides digital data over the NRZ bus 96 to channel 68 that, in turn, encodes the data prior to its transmittal to preamplifier 42.

The HIDC 74 may comprise a disk controller 80 for formatting and providing error detection and correction of disk data, a host interface controller 76 for responding to commands from host 36, and a buffer controller 78 for storing data that is transferred between disks 12 and host 36. Collectively, the controllers in the HIDC 74 provide automated functions that assist the microprocessor 84 in controlling disk operations. A servo controller 98 provides an interface between the microprocessor 84, the actuator assembly 130 and the spindle motor 113. Microprocessor 84 commands logic in servo controller 98 to position actuator assembly 130 using the VCM driver 102 via the DAC 101 and to precisely control the rotation of spindle motor 113 with spindle motor driver 103.

According to embodiments of the present invention, the spin up profiles may be defined to limit the acoustic noise generated by the spindle motor 113 during the spin up phase of its operation. For example, the first and second spin up profiles 107, 109 may be defined such that the spindle motor 113 generates less acoustic noise when spinning up according to the second spin profile 109 than when spinning up according to the first spin up profile 107. Indeed, the first spin profile 107, according to an embodiment of the present invention, may define a spin up profile in which the spindle motor is accelerated rapidly to its target velocity. As shown in FIG. 1, if the spindle motor is spun up following the first spin up profile 107, the target velocity of the spindle motor 113 is achieved at time $t_1$. Alternatively, the spindle motor 113 may be spun up in a manner in which some measure time to target velocity is sacrificed in favor of a reduced-audible noise operation during spin up. As shown, if the spindle motor 113 is spun up following the second spin up profile 109, the target velocity of the spindle motor 113 is achieved at time $t_2$, which is comparatively later in time than $t_1$. A plurality of other third spin up profiles may be defined, each exhibiting differing acoustic levels and/or time to target velocity characteristics. According to embodiments of the present invention, any of the defined spin up profiles, whether defined with an emphasis on higher performance or reduced-audible noise operation, may be asynchronously and/or adaptively invoked responsive to some stimuli, such as a measured quantity, a detected event or characteristic and/or one or more commands from the host. The advent of such stimuli may, in this manner, cause the drive 100 to spin up the spindle motor 113 with a selected one of the plurality of defined spin up profiles.

The spin up profiles, according to the present invention, may be defined in terms of velocity over time, acceleration over time, applied maximum current over time or, for example, spindle motor commutation frequency profiles. Such profiles, in turn, may be stored in a memory (such as ROM 106 or RAM 108, for example) and accessed prior to spinning up the spindle motor 113. Upon start-up of the disk drive 100 and associated disk drive control programs, the selected spin up profile may be selected and accessed by, for example, the spindle motor driving circuit 103 and the spindle motor spun up according to the profile defined by the selected profile.

Figure 3:
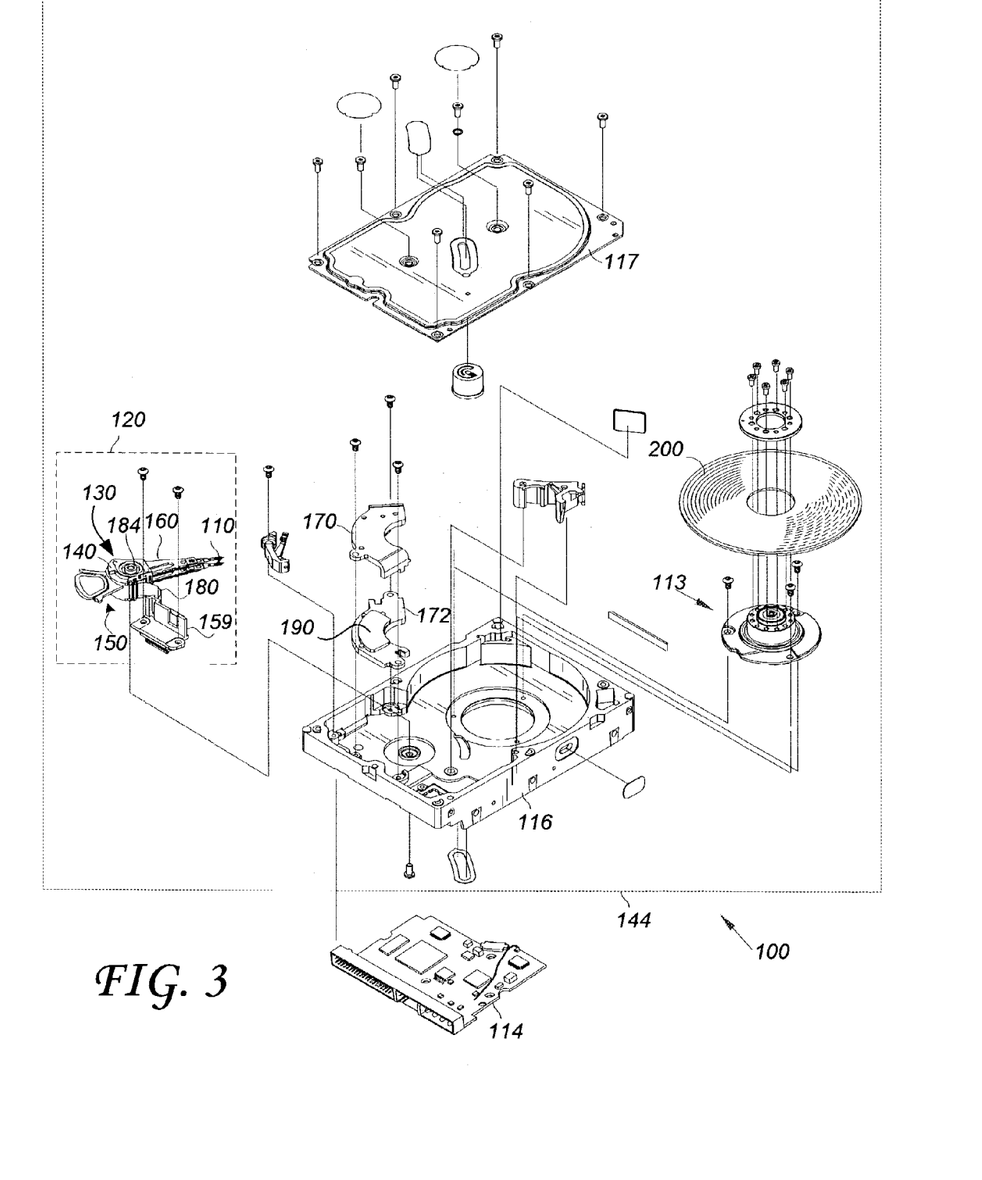
FIG. 3 is an exploded view of a disk drive according to an embodiment of the present invention.

FIG. 3 shows the principal components of a magnetic disk drive 100 constructed in accordance with an embodiment of the present invention. With reference to FIG. 3, the disk drive 100 comprises a head disk assembly (HDA) 144 and a printed circuit board assembly (PCBA) 114. The HDA 144 includes a base 116 and a cover 117 attached to the base 116 that collectively house a disk 200, a spindle motor 113 attached to the base 116 for rotating the disk(s) 200, a head stack assembly (HSA) 120, and a pivot bearing cartridge 184 that rotatably supports the HSA 120 on the base 116. The spindle motor 113 rotates the disk 200 at a constant angular velocity. The HSA 120 comprises a swing-type or rotary actuator assembly 130, at least one head gimbal assembly (HGA) 110, a flex circuit cable assembly 180 and a flex bracket 159. The rotary actuator assembly 130 includes a body portion 140, at least one actuator arm 160 cantilevered from the body portion 140, and a coil portion 150 cantilevered from the body portion 140 in an opposite direction from the actuator arm 160 and supported by first and second actuator fork members. A bobbin 302 may be attached to the inner periphery of the coil of the coil portion 150 to stiffen the coil portion 150. The actuator arm(s) 160 support the HGA(s) 110 that, in turn, support slider(s) (not shown) for reading and writing to the disk 200. The HSA 120 is pivotally secured to the base 116 via the pivot-bearing cartridge 184 so that the slider at the distal end of the HGA 110 may be moved over the surfaces of the disk 200. A preferred embodiment of the present invention is a ramp-loaded drive (ramp load not shown in FIG. 2), to reduce head degradation due to slower/longer spin up times of the spindle motor 113. The pivot-bearing cartridge 184 enables the HSA 120 to pivot about a pivot axis. The storage capacity of the HDA 144 may be increased by, for example, increasing the track density on the disk 200 and/or by including additional disks in the drive and by an HSA 120 having a vertical stack of HGAs 110 supported by multiple actuator arms 160. The "rotary" or "swing-type" actuator assembly rotates on the pivot bearing 184 cartridge between limited positions, and the coil portion 150 that extends from one side of the body portion 140 interacts with one or more permanent magnets 192 mounted to back irons 170, 172 to form a voice coil motor (VCM). The VCM causes the HSA 120 to pivot about the actuator pivot axis 182 and causes the slider and the read write transducers thereof to sweep radially over the disk 200.

Figure 4:
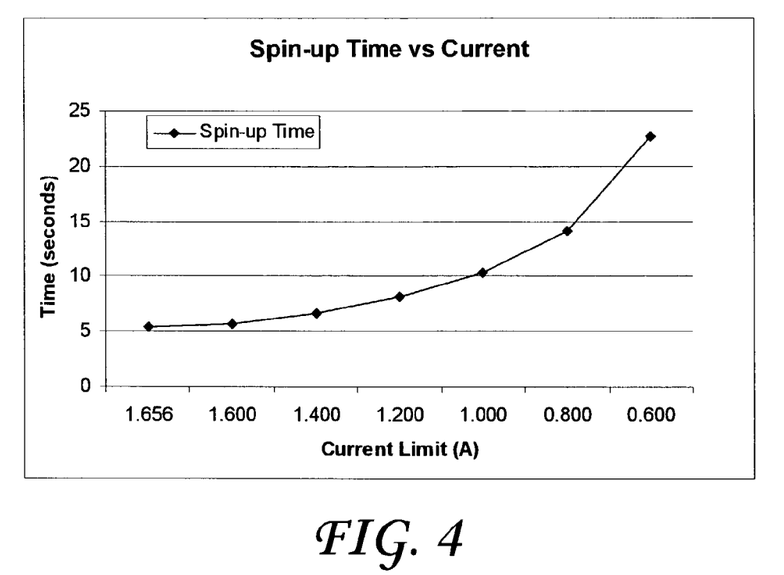
FIG. 4 is a graph illustrating a relationship of spin up time versus current, according to embodiments of the present invention.

FIG. 4 is a graph showing exemplary spin up times relative to maximum applied current of a spindle motor 113 of a disk drive 100 according to embodiments of the present invention. As shown, if the current applied to the spindle motor 113 is limited to about 1.656 amps, the spindle motor takes about 5.5 seconds to spin up to its target velocity, whereas if the current applied to the spindle motor 113 is limited to a maximum of about 0.6 amps, the spindle motor 113 takes about 22.7 seconds to spin up to its target velocity. Generally, longer spin up times correlate with quieter operation (i.e., operation that generates less audible acoustic noise) during the spin up phase of operation of the spindle motor 113. Therefore, for applications in which an acoustically quieter drive is desired and in which the spin up time can be extended without loss of functionality or performance, the maximum current applied to the spindle motor 113 during the spin up phase may be limited as shown in FIG. 4. The current vs. spin up time relationship shown in FIG. 4 may be used to define a plurality of spin up profiles according to embodiments of the present invention. It is to be noted that the current—spin up time relationship shown in FIG. 4 is but an exemplary relationship and that different spindle motors may exhibit different current—spin up time relationships. Accordingly, such relationships are preferably characterized for each spindle motor to be used prior to defining the spin up profiles.

Figure 5:
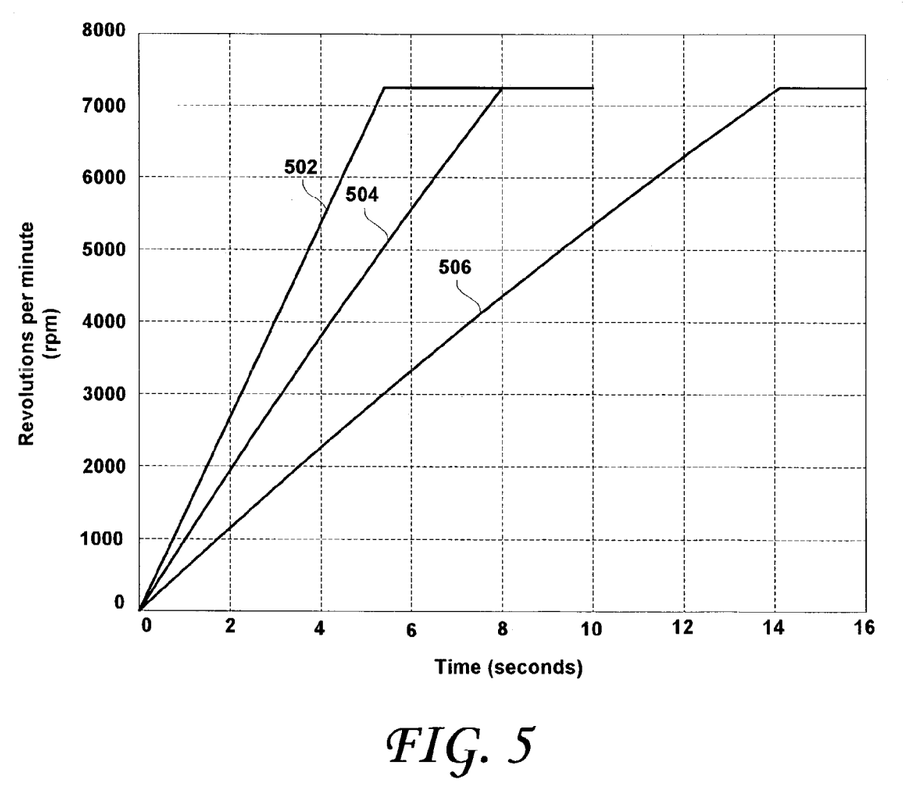
FIG. 5 is a graph illustrating the velocity versus time of a spindle motor during spin up, for three different maximum currents, according to embodiments of the present invention.

FIG. 5 is a graph showing exemplary spindle motor velocities over time at three exemplary current limits, according to embodiments of the present invention. Three velocity curves are shown. Velocity curve 502 shows the angular velocity of the spindle motor in revolutions per minute (rpm) in the case wherein the motor current is limited to about 1.656 amps, velocity curve 504 shows the angular velocity of the spindle motor in rpm in the case wherein the motor current is limited to about 1.2 amps and velocity curve 506 shows the angular velocity of the spindle motor in rpm in the case wherein the motor current is limited to about 0.8 amps. As shown, the spindle motor reaches its target velocity (in this example, 7200 rpm) at about 5.5, 8.1 and 14.1 seconds at a current limit of 1.656, 1.2 and 0.8 amps, respectively. It is understood that other spindle motors will exhibit velocity curves that differ from the exemplary curves shown in FIG. 5.

Figure 6:
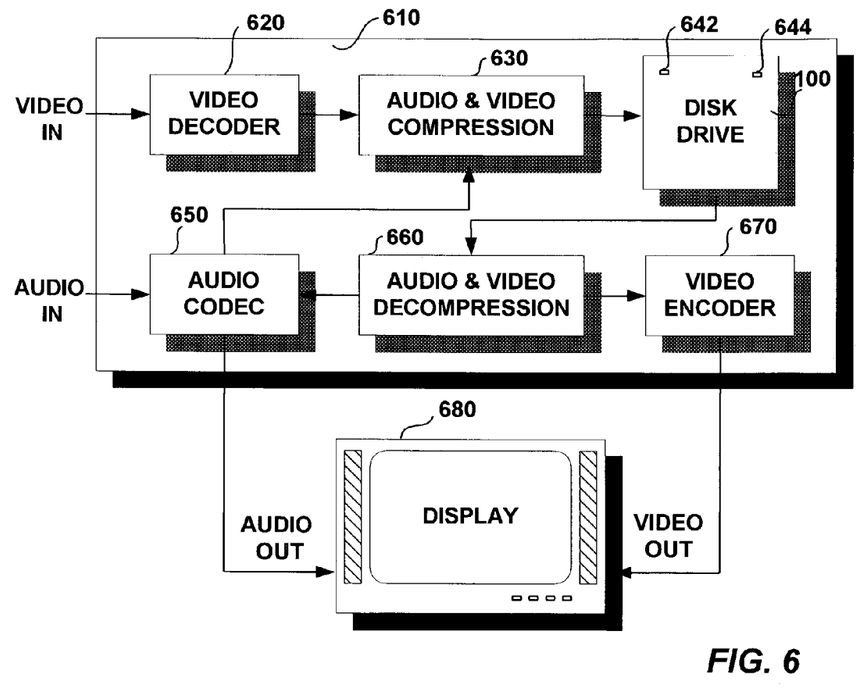
FIG. 6 is a block diagram of a video recorder and playback device incorporating a disk drive incorporating aspects of embodiments of the present invention.

One example of a host device in which embodiments of the present invention may be used is the random access media recorder/player, commonly known as digital video recorders or DVRs. Such devices are configured to record and play video and/or audio stream and are gaining widespread acceptance and popularity in the home. FIG. 6 illustrates another aspect of the present invention; namely a random access video recorder/player 610. As shown in FIG. 6, such a video recorder/player 610 may include a video decoder to decode the incoming video stream, labeled "Video In". Such a decoder may include, for example, a video decoder 620 for decoding a National Television Standards Committee (NTCS)-encoded video stream, a Phase Alternate Line (PAL)-encoded video stream and/or a video stream encoded according to the Systeme Electronique Couleur Avec Memoire (SECAM) protocol. Alternatively, the incoming video stream may be a three component stream formatted according to the Red Green Blue (RGB) protocol, or the YUV or YCbCr protocols, for example, where Y is the luminance component and U, Cb and V, Cr are the chrominance components of the incoming video signal. The video signal may be alternatively formatted according to some other protocol not discussed herein. An audio coder-decoder (codec) 650 is provided to decode an audio data stream input to the video recorder (labeled "Audio In") to provide a decoded audio stream. Audio and video compression may be carried out at 630 according to known techniques and the compressed and decoded audio and video streams may be stored in the disk drive shown at reference 100. The disk drive 100 coupled to the audio and video compressor 630, according to embodiments of the present invention, may be selectively spun up according to a selected one of a plurality of spin up profiles. An audio and video decompressor 660 may be coupled to the disk drive 100 and to the audio codec 650, the audio and video decompressor 660 decompressing the stored encoded video stream according to known techniques and sending the decompressed audio stream to the audio codec 650 to re-encode the decompressed audio stream. A video encoder 670 may be coupled to the audio and video decompressor 660, the video encoder 670 encoding the decompressed video stream to a selected display format, according to the aforementioned NTSC, PAL, SECAM, RGB, YUV or YCbCr protocols, for example. The decompressed and encoded audio and video streams may then be input to a display device, such as a television monitor or a computer display terminal, for example. The disk drive 100 may be configured to receive a command from the DVR 610 via the host interface, shown at 76 in FIG. 2. For example, the command for causing the disk drive 100 to spin up its spindle motor 113 according to a selected spin up profile may include, for example, a set audio/visual mode "SET A/V" command, which command may or may not be followed by a number of parameters. The SET A/V command, according to an embodiment of the present invention, may cause the spindle motor 113 to be spun up using the second spin up profile 109 or some other spin up profile that causes the spindle motor 113 to generate little acoustic noise. This may be done to minimize potentially bothersome noise from the drive while the user is viewing audio/visual content, for example, on the hard disk drive 100. For example, the "SET A/V" command may be set by the host device or the drive 100 when the drive is to spin up its spindle motor 113 in the middle of the night. In this manner, a spin up profile that generates little perceptible acoustic noise may be selected, so as not to disturb the user when the host device is to access the disk drive when the user is sleeping, for example. To do so, the drive 100 may generate or may be configured to receive a time of day signal from a clock within the drive or external thereto, and may select, for example, a spin up profile defining an aggressive spin up rate for the spindle motor 113 when the acoustic noise associated with such an aggressive spin up rate is unlikely to disturb the user or a less aggressive spin up profile that generates little spindle motor acoustic noise when the time of day signal indicates that it is late at night, for example. Such a time of day signal may be output from a clock mounted within or to the drive 100 (as shown at reference 644 in FIG. 6) or from a timing circuit within, for example, the microprocessor 84 or the servo controller 98. The spindle motor driving circuit may be responsive to such a time of day signal to drive the spindle motor 113 according to a selected one of the predefined spin up profiles depending upon, for example, a time of day and/or the date. The generation of the time of day signal, according to the present invention, may be a programmable event, the timing thereof being selected by the user and input to the drive-containing device via a suitable user interface, such as a remote control device.

The disk drive 100 according to embodiments of the present invention may be incorporated in any number of computer-based devices, consumer devices and/or hybrids thereof. For example, the drive 100 may be incorporated in a set-top appliance that may integrate, for example, computing, Internet access and browsing capabilities, as well as cable television decoding functions, for example. When the set-top device is used as a computer or as a so-called network appliance, relatively faster spindle motor spin up performance may be of greater perceived value to the user than lowered acoustics. Conversely, when the same set-top device is used as a cable TV decoder and/or as a television recorder-player device, a quieter mode of operation (characterized by less aggressive, somewhat slower spin up operations) may be paramount. Toward that end, any of the methods and/or devices disclosed herein for automatically, manually or adaptively selected and/or switching between spin up profiles may be implemented.

As noted above, a plurality of mutually third spin up profiles may also be defined, each of the plurality of third spin up profiles, when selected, causing the spindle motor 113 to spin up in a manner that generates mutually different levels of audible noise. As also noted above, the spindle motor driving circuit 103 may be configured to spin up the spindle motor 113 according to a selectable spin up profile, responsive to a command issued, for example, by the host. Such a host command may include an audible noise level parameter designating one of the plurality of third spin up profiles. For purposes of illustration, the illustrative SET A/V command referenced above may be configured to include a selected audible noise level parameter ranging from 0 to n, where n is the number of available different third spin up profiles. According to an embodiment of the present invention, for example, a SET A/V 3 command issued from the host 36 may cause a spin up profile corresponding to the "3" parameter (corresponding to a predetermined maximum spindle motor noise level) to be accessed by, for example, the servo controller 98. The servo controller 98, in turn, may output a digital control signal corresponding to the accessed spin up profile to the DAC 104. The DAC 104, in turn, generates a corresponding analog signal to the spindle motor driver 103, which provides the driving current to the spindle motor 113 in accordance with the accessed spin up profile. The drive 100, in this manner, may be controlled to spin up its spindle motor 113 according to the third of n possible spin up profiles.

Alternatively, the drive 100 may be caused to toggle between spin up profiles. For example, one or more user-actuable switches (shown at reference numerals 25 in FIG. 1 and 642 in FIG. 6) may be provided to allow the user of the drive 100 or of the drive-containing device to toggle between the more aggressive and faster spin up operation of the spindle motor 113 and less aggressive and quieter spin up operations. Such a user-actuable switch 642 may include a user-accessible push-button or toggle switch, for example, mounted on the drive 100 or on the drive-containing device (e.g., host 36, DVR 610 or other host device 700). According to an embodiment of the present invention, the user-actuable switch 642 may be configured to allow the user to manually cycle between the spin up profiles. For example, starting form the higher performance spin up profile, the user may depress the user-actuable switch 642 once to cause the drive 100 to invoke and cause spin up operations to be carried out according to a slower and quieter spin up profile, depress the user-actuable switch 642 again to invoke and cause spin up profiles according to an even quieter spin up profile, and so on. In this manner, depressing the user-actuable switch 642 further may cause the drive 100 to spin up its spindle motor 113 according to successively different spin up profiles until the last such spin up profile, whereupon the drive 100 may revert back to the higher performance spin up profile. Other schemes for manually invoking such spin up profiles may be envisaged by those of skill, and all such schemes should be deemed to fall within the scope of the present invention.

Figure 7:
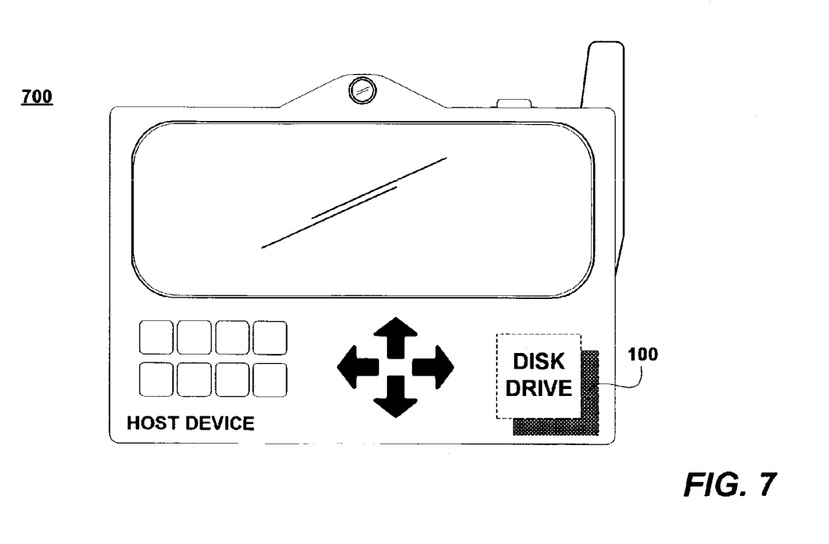
FIG. 7 is a representation of a host device that includes a disk drive, according to another embodiment of the present invention.

FIG. 7 shows a generic host device 700 incorporating a disk drive 100 according to embodiments of the present invention. The host device 700 may be or include a personal computer, a personal information manager, a still and/or video camera, a wireless telephone or other communication or entertainment device, for example. In this embodiment, the host 700 may generate a signal or issue a command that may be interpreted by the contained disk drive 100 as requiring a change from one spin up profile to another or requiring maintaining the same spin up profile as the selected spin up profile. In other embodiments, the selection of spin up profiles may be made adaptively, responsive to some internal or external stimuli, such as the ambient noise level (i.e., the noise level prevailing just before the spindle motor is spun up). For example, the disk drive 100 and/or the host device 700 may include an ambient acoustic level measuring circuit coupled to the spindle motor driving circuit 103. The spindle motor driving 103 circuit may then be configured to spin up the spindle motor 113 according to a first spin up profile (such as spin up profile 107, for example) when the ambient acoustic level is above a selectable threshold and to spin up the spindle motor 113 according to a second spin up profile (such as spin up profile 109, for example) when the ambient acoustic level is below the selectable threshold. For example, the ambient acoustic level measuring circuit may include a microphone. Accordingly, the drive 100 may be caused to spin up its spindle motor 113 according to a selected one of the spin up profiles whenever the ambient acoustic level falls below a predetermined or programmable (and/or user-defined) noise threshold. In this manner, when the ambient acoustic level falls below the noise threshold, the drive 100 will automatically spin up the spindle motor 113 according to the quieter spin up profiles. The spinning up of the spindle motor 113, therefore, will be quiet when the ambient noise levels are low and may generate comparatively more noise during spin up when the ambient noise is above the threshold. Alternatively, a plurality of mutually different noise thresholds may be set, each causing a different one of the spin up profiles to be selected, as the ambient noise levels rise and fall. Therefore, the spindle motor spin up operation of the drive 100 according to embodiments of the present invention may be thought as adaptive, inasmuch as it spins up its spindle motor 113 differently responsive to changing ambient acoustic conditions (or other stimuli).

According to further embodiments of the present invention, the disk drive 100 and/or the host device may include a register for storing a spin up profile flag. In that case, the spindle motor driving circuit 103 may be configured to drive the spindle motor 113 according to the first spin up profile 107 when the spin up profile flag is in a first logical state (such as a logical 1, for example) and to drive the spindle motor according to the second spin up profile 109 when the spin up profile flag is in a second logical state (such as a logical 0, for example). In the case wherein more than two spin up profiles are defined, the register may be configured to store a multi-bit flag and the drive 100 may be configured to read the contents of the register and to select the spin up profile that corresponds to the value of the flag stored in the register. The flag may be stored, for example, in a flash memory, the RAM 108 or the ROM 106, for example. Those of skill in this art may recognize other means of designating one of the plurality of spin up profiles as the selected spin up profile. For example, the drive 100 may include a spin up profile jumper (e.g., a pair of prongs that are electrical contact points set into the HDIC 114) to designate one of the plurality of spin up profiles. The settings of the spin up profile jumper, in this manner, may determine which of the spin up profiles is selected. When the spin up profile jumper is set, a conductive cap may be placed across the prongs thereof to completes the electrical contact between the prongs. The setting of the spin up jumper, in this manner, tells the disk drive 100 which spin up profile to follow in spinning up the spindle motor 113. Physical jumpers, however, may not be required and the setting and changing of the spin up profiles may be carried out by the host or by the user, through a suitable user interface.

The disk drive 100 disclosed and shown herein may be incorporated within devices other than computers and video recorder/players, however. Indeed, the enhanced acoustic behavior of the drive 100 according to the present invention lends itself to a host of other applications. For example, the drive 100 may be incorporated into still and video cameras, audio recorders, musical instruments, kitchen and home appliances or any device that may benefit from a mass storage device having a spindle motor that may be selectively spun up according to at least a first and a second spin up profile.

I claim:

1. A disk drive, comprising:
    a base;
    a disk;
    a clock configured to generate a time of day indicating signal;
    a spindle motor for spinning the disk, the spindle motor being attached to the base;
    a spindle motor driving circuit for driving the spindle motor, the spindle motor driving circuit being configured to receive the time of day indicating signal and to selectively spin up the spindle motor according to one of:
        a first spin up profile, and
        a second spin up profile defined to provide a longer spin up time in comparison with a spin up time defined by the first spin up profile responsive to a state of the time of day signal, the state of the time of day indicating signal indicating a time of day.

2. The disk drive of claim 1, wherein the spindle motor driving circuit is configured to drive the spindle motor according to the first spin up profile responsive to a first command and to drive the spindle motor according to the second spin up profile responsive to a second command.

3. The disk drive of claim 1, wherein the spindle motor driving circuit is configured to drive the spindle motor according to the first spin up profile responsive to a first signal and to drive the spindle motor according to the second spin up profile responsive to a second signal.

4. The disk drive of claim 1, wherein the first and second spin up profiles are defined such that the spindle motor generates less acoustic noise when spinning up according to the second spin profile than when spinning up according to the first spin up profile.

5. The disk drive of claim 1, further including a register for storing a spin up profile flag according to the state of the time of day indicating signal and wherein the spindle motor driving circuit is configured to drive the spindle motor according to the first spin up profile when the spin up profile flag is in a first logical state and to drive the spindle motor according to the second spin up profile when the spin up profile flag is in a second logical state.

6. The disk drive of claim 1, further including a flash memory for storing a spin up profile flag according to the state of the time of day indicating signal and wherein the spindle motor driving circuit is configured to drive the spindle motor according to the first spin up profile when the spin up profile flag is in a first logical state and to drive the spindle motor according to the second spin up profile when the spin up profile flag is in a second logical state.

7. The disk drive of claim 1, further including an ambient acoustic level measuring circuit coupled to the spindle motor driving circuit, the spindle motor driving circuit being configured to spin up the spindle motor according to the first spin up profile according to the state of the time of day indicating signal and when the ambient acoustic level is above a selectable threshold and to spin up the spindle motor according to the second spin up profile according to the state of the time of day indicating signal and when the ambient acoustic level is below the selectable threshold.

8. The disk drive of claim 7, wherein the ambient acoustic level measuring circuit includes a microphone.

9. The disk drive of claim 1, wherein the spindle motor driving circuit is configured to selectively drive the spindle motor according to one of a plurality of mutually different third spin up profiles, each of the plurality of third spin up profiles being defined to provide mutually different combinations of spin up times and audible noise during spin up of the spindle motor.

10. The disk drive of claim 9, further including an ambient acoustic level measuring circuit coupled to the spindle motor driving circuit and wherein the spindle motor driving circuit is configured to drive the spindle motor according to the first spin up profile, the second spin up profile or one of the plurality of third spin up profiles according to the state of the time of day indicating signal and according to an ambient acoustic level measured by the ambient acoustic level measuring circuit.

11. A host device including a user interface and a data storage device, the data storage device comprising:
    a base;
    a disk;
    a clock configured to generate a time of day indicating signal;
    a spindle motor for spinning the disk, the spindle motor being attached to the base;
    a spindle motor driving circuit for driving the spindle motor, the spindle motor driving circuit being configured to receive the time of day indicating signal and to selectively spin up the spindle motor according to one of:
        a first spin up profile, and
        a second spin up profile defined to provide a longer spin up time in comparison with a spin up time defined by the first spin up profile responsive to a state of the time of day signal, the state of the time of day indicating signal indicating a time of day.

12. The host device of claim 11, wherein the spindle motor is configured to be spun up according to the first spin up profile responsive to a first command and to be spun up according to the second spin up profile responsive to a second command.

13. The host device of claim 11, wherein the spindle motor is configured to be spun up according to the first spin up profile responsive to a first signal and to be spun up according to the second spin up profile responsive to a second signal.

14. The host device of claim 11, wherein the first and second spin up profiles are defined such that the spindle motor generates less acoustic noise when spinning up according to the second spin profile than when spinning up according to the first spin up profile.

15. The host device of claim 11, further including an ambient acoustic level measuring circuit, the spindle motor being configured to be spun up according to the first spin up profile according to the state of the time of day indicating signal and when the ambient acoustic level is above a selectable threshold and to be spun up according to the second spin up profile according to the state of the time of day indicating signal and when the ambient acoustic level is below the selectable threshold.

16. The host device of claim 15, wherein the ambient acoustic level measuring circuit includes a microphone.

17. A random access media recorder/player configured to record and play a video and/or audio stream, comprising:
 a user interface and a disk drive, the disk drive including:
  a base;
  a disk;
  a clock configured to generate a time of day indicating signal;
  a spindle motor for spinning the disk, the spindle motor being attached to the base;
  a spindle motor driving circuit for driving the spindle motor, the spindle motor driving circuit being configured to receive the time of day indicating signal and to selectively spin up the spindle motor according to one of:
   a first spin up profile, and
   a second spin up profile defined to provide a longer spin up time in comparison with a spin up time defined by the first spin up profile responsive to a state of the time of day signal, the state of the time of day indicating signal indicating a time of day.

18. The random access media recorder/player of claim 17, wherein the spindle motor is configured to be spun up according to the first spin up profile responsive to a first command and to be spun up according to the second spin up profile responsive to a second command.

19. The random access media recorder/player of claim 17, wherein the spindle motor is configured to be spun up according to the first spin up profile responsive to a first signal and to be spun up according to the second spin up profile responsive to a second signal.

20. The random access media recorder/player of claim 17, wherein the first and second spin up profiles are defined such that the spindle motor generates less acoustic noise when spinning up according to the second spin profile than when spinning up according to the first spin up profile.

21. The random access media recorder/player of claim 17, further including an ambient acoustic level measuring circuit, the spindle motor being configured to be spun up according to the first spin up profile according to the state of the time of day indicating signal and when the ambient acoustic level is above a selectable threshold and to be spun up according to the second spin up profile according to the state of the time of day indicating signal and when the ambient acoustic level is below the selectable threshold.

22. The random access media recorder/player of claim 21, wherein the ambient acoustic level measuring circuit includes a microphone.

23. Method of operating a disk drive, comprising:
 providing a clock within the disk drive, the clock being configured to generate a time of day indicating signal;
 generating the time of day indicating signal;
 a first spinning up step to spin up the spindle motor according to a first spin up profile responsive to a first state of the time of day indicating signal;
 a second spinning up step to spin up the spindle motor according to a second spin up profile responsive to a second state of the time of day indicating signal, the second spin up profile being defined to provide a longer spin up time in comparison with a spin up time defined by the first spin up profile, and
 selectively reading and/or writing to a disk after the spindle motor has been spun up to a target operating velocity.

24. The method of claim 23, wherein the first and second spin up profiles are defined such that the spindle motor generates less acoustic noise when spinning up according to the second spin profile than when spinning up according to the first spin up profile.

25. The method of claim 23, wherein the first and second spin up profiles are defined such that the spindle motor spins up in a shorter period of time when spinning up according to the first spin profile than when spinning up according to the second spin profile.

26. The method of claim 23, wherein the first spinning up step is carried out responsive to a first command and wherein the second spinning up step is carried out responsive to a second command.

27. The method of claim 23, wherein the disk drive includes a register for storing a spin up profile flag and wherein the first spinning up step is carried out according to the state of the time of day indicating signal and when the spin up profile flag is in a first logical state and wherein the second spinning up step is carried out according to the state of the time of day indicating signal and when the spin up profile flag is in a second logical state.

28. The method of claim 23, wherein the disk drive includes a flash memory for storing a spin up profile flag and wherein the first spinning up step is carried out according to the state of the time of day indicating signal and when the spin up profile flag is in a first logical state and wherein the second spinning up step is carried out according to the state of the time of day indicating signal and when the spin up profile flag is in a second logical state.

29. The method of claim 23, wherein the disk drive includes a user-actuable switch and wherein the first spinning up step is carried out according to the state of the time of day indicating signal and when the user-actuable switch is in a first state and wherein the second spinning up step is carried out according to the state of the time of day indicating signal and when the user-actuable switch is in a second state.

30. The method of claim 23, wherein the disk drive includes an ambient acoustic level measuring circuit, and wherein the first spinning up step is carried out according to the state of the time of day indicating signal and when the ambient acoustic level is above a selectable threshold and wherein the second spinning up step is carried out according to the state of the time of day indicating signal and when the ambient acoustic level is below the selectable threshold.

31. The method of claim 30, wherein the ambient acoustic level measuring circuit includes a microphone and wherein the first spinning up step is carried out according to the state of the time of day indicating signal and when the ambient acoustic level measured by the microphone is above a selectable threshold and wherein the second spinning up step is carried out according to the state of the time of day indicating signal and when the ambient acoustic level measured by the microphone is below the selectable threshold.

32. The method of claim 23, further comprising:
a third spinning step to spin up the spindle motor according to one of a plurality of mutually different third spin up profiles responsive to a corresponding plurality of third states of the time of day indicating signal, each of the plurality of third spin up profiles being defined to provide mutually different combinations of spin up times and audible acoustic noise during spin up of the spindle motor.

33. The method of claim 32, wherein the disk drive includes an ambient acoustic level measuring circuit and wherein one of the first, second and third spinning steps is carried out according to the time of day indicating signal and an ambient acoustic level measured by the ambient acoustic level measuring circuit.

* * * * *